United States Patent [19]
Yamanishi et al.

[11] Patent Number: 4,748,498
[45] Date of Patent: May 31, 1988

[54] LUMINANCE SIGNAL PROCESSING CIRCUIT WITH RECURSIVE FILTER FOR REDUCING NOISE WHILE RETAINING A HIGH VERTICAL RESOLUTION

[75] Inventors: Kazuhiro Yamanishi, Higashiosaka; Kouichi Igata, Hirakata, both of Japan

[73] Assignee: Matsushita Electric Industrial Co., Ltd., Osaka, Japan

[21] Appl. No.: 931,063

[22] Filed: Nov. 17, 1986

[30] Foreign Application Priority Data

Nov. 19, 1985 [JP] Japan ................... 60-258934
Dec. 6, 1985 [JP] Japan ................... 60-275319

[51] Int. Cl.⁴ .................................... H04N 5/213
[52] U.S. Cl. ........................ 358/36; 358/37; 358/166; 358/167
[58] Field of Search ............. 358/36, 167, 329, 340, 358/31, 37, 166

[56] References Cited

U.S. PATENT DOCUMENTS 4,571,613 2/1986 Fukuda ................... 358/36

Primary Examiner—John W. Shepperd
Attorney, Agent, or Firm—Wenderoth, Lind & Ponack

[57] ABSTRACT

A luminance signal processing circuit includes a delay circuit for delaying a signal by one horizontal period, a first adder for adding an input signal and an output signal of the delay circuit, a filter circuit for passing a specified frequency band of an output of the first adder, a first coefficient circuit for multiplying an output of the filter circuit with a specified coefficient, a second adder for adding an output of the first coefficient circuit and the input signal to use the sum output signal as the input signal to the delay circuit, a subtracter for subtracting the output signal of the delay circuit from the input signal of the delay circuit, an amplitude limiter for limiting the amplitude of an output of the subtracter, and a second coefficient circuit for multiplying an output of the amplitude limter with a specified coefficient. An output signal of the second coefficient circuit is substracted from the input signal to reduce noise in the input signal, or added to the input signal to emphasize the input signal. In the presence of vertical correlation, this circuit acts as a comb filter with a varied passing range depending on frequency to effectively reduce visible noise. In the absence of vertical correlation, the output signal is hardly affected and the noise reduction is not effected, so that the vertical resolution is not lowered.

13 Claims, 5 Drawing Sheets

LUMINANCE SIGNAL PROCESSING CIRCUIT WITH RECURSIVE FILTER FOR REDUCING NOISE WHILE RETAINING A HIGH VERTICAL RESOLUTION

BACKGROUND OF THE INVENTION

1. Field of the Invention

This invention relates to a luminance signal processing circuit for reducing noise in a liminance signal of a video signal, and being used in a video signal recording and reproducing apparatus such as a video tape recorder (VTR).

2. Description of the Prior Art

Conventionally, in the luminance signal reproducing circuit of VTR, a noise reducing circuit was provided in order to reduce the noise level in the reproduced luminance signal after frequency demodulation. FIG. 8 shows a block diagram of such conventional noise reducing circuit. In this diagram, the reproduced luminance signal enters into an input terminal 101, and its frequency components of, for example, 1 MHz or higher are taken out by a high-pass filter 102. Since the signal components are large in amplitude and noise components are relatively small in amplitude, the signal components of large amplitude are suppressed in an amplitude limiter 103 while only the noise components small in amplitude are left. These noise components are adjusted to be the same in amplitude as the input signal in a coefficient circuit 104 and supplied to a subtraction circuit 105 to be subtracted from the input reproduced luminance signal. Since visible noises are generally those of high frequency and small amplitude components of over 1 MHz, a signal reduced in the visible noise is obtained.

Another conventional example of the noise reducing circuit is shown in FIG. 10. In this example, the reproduced luminance signal entered into an input terminal 107 is fed to a 1H delay circuit 108 to be delayed for one horizontal period (1H), and is then fed into a subtraction circuit 109 to be subtracted from the input luminance signal. Incidentally, as it is well known, a video signal has a vertical correlation that two signal mutually spaced by 1H are extremely similar to each other, whereas such vertical correlation is not present in the noise. Therefore, the output of this subtraction circuit 109 is a luminance signal component having no vertical correlation with the noise. This signal is limited in amplitude by an amplitude limiter 110 which has an amplitude limit value approximately equal to the peak value of the noise, so that the luminance signal components of large amplitude having no vertical correlation are removed, and only the noise components are taken out. The noise components are substracted from the input signal in a substraction circuit 111. As a result, the input luminance signal is greatly reduced in the noise level, and is delivered to an output terminal 112.

It is also known, as shown in FIG. 11, to extract components having no vertical correlation by using a recursive comb filter, and subtract them from the input signal.

In FIG. 11, the video signal entered into an input terminal 1 passes through a recursive comb filter composed of adder 10, 1H delay circuit 11, and first coefficient circuit 12, so that the components having vertical correlation are extracted. This signal is fed into a second coefficient circuit 13, where its amplitude is adjusted to the input signal, and it is subtracted from the input video signal in a subtractor 14, so that the components having no vertical correlation are extracted, and an output signal is obtained through a third coefficient circuit 15. Supposing the coefficient of the first coefficient circuit 12 to be k (o<k<1) and that of the second coefficient circuit 13 to be 1−k, by selecting the coefficient of the third coefficient circuit 15 to be 1+k, the height of the peak of frequency characteristic of the output becomes constant, regardless of coefficient k.

The transfer function G in FIG. 11 is expressed as follows:

$$G = \frac{(1+k)(1-\epsilon)}{1-k\epsilon} \quad (1)$$

where $\epsilon = \exp(-j\omega/f_H)$

From equation (1), if the frequency of the input signal is $nf_H$ (n being an integer), then $\epsilon=1$, so G=0; if it is $(n+0.5)f_H$, then $\epsilon=-1$, so G=2. That is, the characteristic of the recursive comb filter is a typical comb filter profile, becoming bottom when the frequency of the input signal is $nf_H$ (n being an arbitrary integer, and $f_H$ a horizontal scanning frequency), and peak when it is $(N+0.5)f_H$. When the coefficient k is small, the passing range is narrow, and when it is large, the range is wide.

There is still another noise reducing circuit as shown in FIG. 13. This is, for example, disclosed in the Japanese Unexamined Patent Publication No. 60-116290. In operation, an output of a 1H delay circuit 126 and an input signal are added in an adding circuit 127. The sum is passed through a high-pass filter 128 and a coefficient circuit 129, and is added with an input signal in an adding circuit 125. This sum is the input to the 1H delay circuit 126 of a recursive comb filter. By using this filter and an equalizer circuit 130 which flattens the frequency characteristic of its output, the circuit is operated to work as a comb filter of a wide passing range when the frequency of input signal is low or as a comb filter of a narrow passing band when the frequency of input signal is high, so that the noise components in the high range can be effectively lowered. Furthermore, in a subtraction circuit 132, a difference signal of this output signal and the input signal is made, and a signal of large amplitude is taken out in a clip circuit 133, that is, a signal of high level and having no vertical correlation is taken out, and added with the output of the equalizer circuit 130 is an adding circuit 134 thereby obtaining a signal without vertical correlation. Thus, it is intended to greatly reduce the visible noise components in the high range if there is vertical correlation, and not to lower the vertical resolution if the frequency is low or there is no correlation.

However, in the conventional noise reducing circuit shown in FIG. 8, if the reproduced luminance signal contains an edge as shown in FIG. 9 (a), the output of the high-pass filter 102 becomes as shown in FIG. 9 (b) while the output of the limiter 103 becomes as in FIG. 9 (c), so that the noise components are eliminated in the amplitude limited area. As a result, the noise is left over in the edge portion as shown in FIG. 9 (d).

In the circuit in FIG. 10, if there is a vertical correlation in the luminance signal, the noise of the edge portion may be improved as compared with the circuit in FIG. 9. However, the improvement of S/N ratio of the entire signal is only several dB. Further, since this has a comb filter characteristic to pass the frequency of an integer times of horizontal scanning frequency $f_H$ by a similar degree over the entire frequency region, the vertical resolution is lowered, and the noise is particularly visible in the low frequency region.

In the recursive comb filter type in FIG. 11, when the passing range is widened, more noise components may be decreased. But since the signal components are decreased too, the vertical resolution is lowered. It has been hence considered to strengthen the decrease of noise components from 1 MHz to 2 MHz that are particularly visible. That is, the coefficient k of the recursive comb filter is raised at the frequency desired to further decrease the noise, or it is sufficient to make the coefficient k larger when the frequency is higher, and smaller when it is lower. For example, a band-pass filter is added to the coefficient circuit in the former case, or a high-pass filter is used in the latter case.

The following explanation refers to the high-pass filter, but the same applies to the band-pass filter.

However, in the circuit in FIG. 11, since there are three coefficient circuits and their coefficients are all different, it is difficult in the circuit design to vary the values of each k depending on the frequency of input signal, and if it were possible, the filter characteristic would be changed due to discrepancy among circuit elements.

The circuit in FIG. 13 solves the above-discussed problems to a certain degree, in which the vertical resolution is not lowered in the low range and the noise is effectively reduced in the high range. But to maintain the frequency characteristic, two filter circuits using resistor and capacitor are needed, such as the high-pass filter and equalizer circuit. Fluctuation of characteristics of the two filters may affect the entire characteristic, or when varying the frequency characteristics, the two filters must be varied, which was not so convenient.

SUMMARY OF THE INVENTION

In the light of the above problems, an object of this invention is to provide a luminance signal processing circuit which is a simple in circuit configuration, capable of greatly reducing the visible noise components in the high frequency range if there is vertical correlation, and high in vertical resolution when the frequency is low or there is no correlation.

In order to achieve the above object, a luminance signal processing circuit of, this invention comprises a delay circuit for delaying a signal for one horizontal period, a first adder for adding an input signal and an output signal from the delay circuit, a filter circuit for passing a specified frequency band of an output of the first adder, a first coefficient circuit for multiplying an output of the filter circuit by a specified coefficient, a second adder for adding an output of the first coefficient circuit and the input signal to use its sum output signal as the input to the delay circuit, a subtractor for subtracting the output signal of the delay circuit from the input signal of the delay circuit, an amplitude limiter for limiting the amplitude of an output of the substractor, a second coefficient circuit for multiplying an output of the amplitude limiter by a specified coefficient, and an operation circuit for calculating a sum of difference of an output signal of the second coefficient circuit and the input signal.

With this configuration, if there is a vertical correlation, the circuit operates as a comb filter with a wide passing band when the frequency of the input signal is low and as a comb filter with a narrow passing band when the frequency is high; and if there is no vertical correlation, the output signal is hardly influenced. Therefore, if there is a vertical correlation, visible noise components in the high frequency region are effectively reduced, and if there is no correlation, the noise reduction operation is not performed, so that the vertical resolution is not lowered.

Moreover, since only one filter circuit is used for achieving this characteristic, the circuit is simple and fluctuation of the characteristic can be restricted.

DESCRIPTION OF THE PREFERRED EMBODIMENTS

Figure 1:
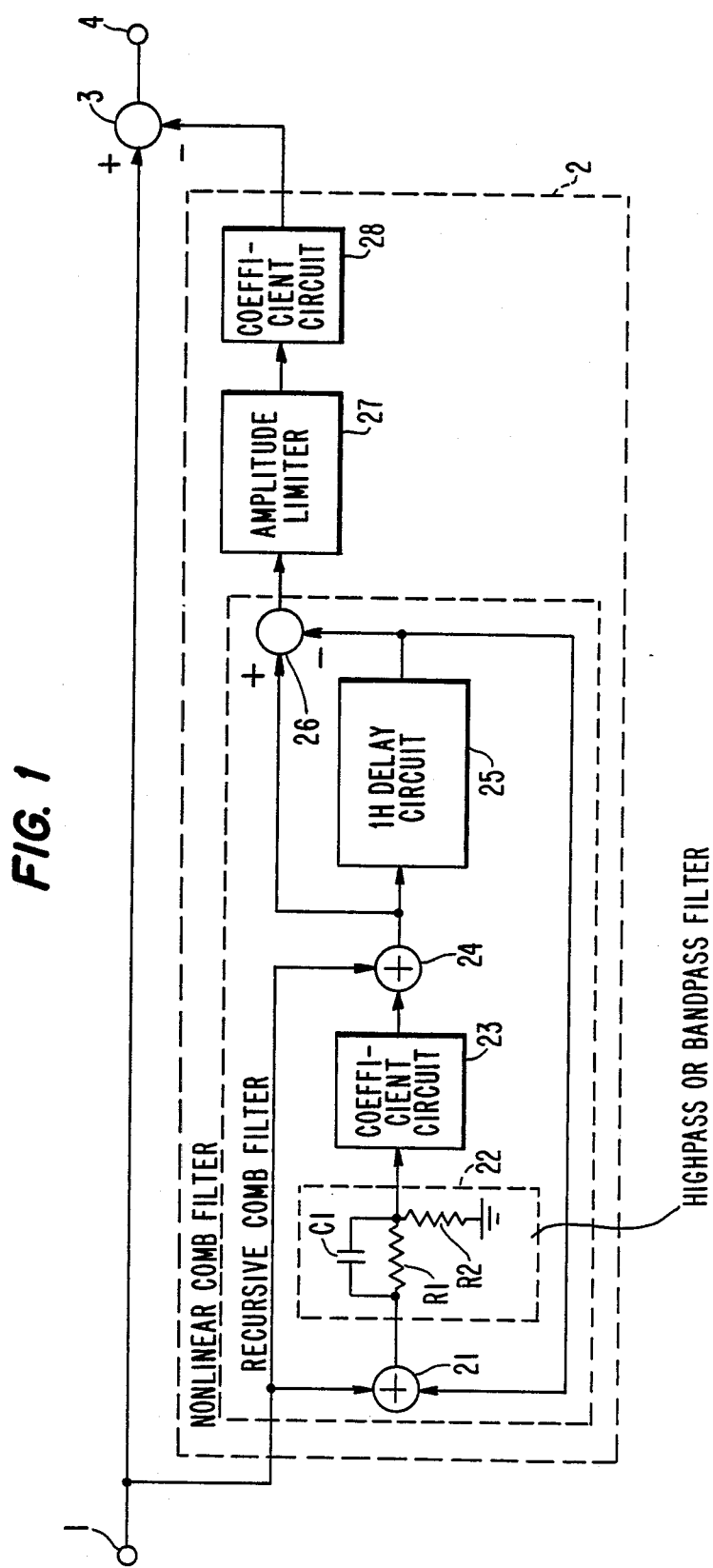
FIG. 1 is a block diagram of a luminance signal processing circuit in an embodiment of this invention.

FIG. 1 is a block diagram of an embodiment of this invention, which is particularly intended to reduce the noise. A luminance signal is fed from an input terminal 1. Noise components are taken out of this input signal by a nonlinear filter 2 including a recursive comb filter 29, and they are subtracted from the input signal in a subtractor 3, so that a noise-reduced signal is delivered to an output terminal 4.

To begin with, the operation of this nonlinear comb filter 2 will be explained. The input signal fed from the input terminal 1 in FIG. 1 is added with an output of a 1H delay circuit 25 in an adder 21, and the sum is fed to a filter circuit 22. An output of the filter circuit 22 is fed to a first coefficient circuit 23, and its output is added again with an input signal in an adder 24 to become the input to the 1H delay circuit 25. The output signal of the 1H delay circuit 25 is subtracted from the input signal of the same 25 in a subtractor 26, and the obtained difference signal is applied to the amplitude limiting circuit 27. Supposing the input signal to be Ei, the output of 1H delay circuit 25 to be $E_1$, a transfer function of the filter circuit 22 to be $a$, a coefficient of the first coefficient circuit 23 to be k, 1H delay to be $\epsilon$, and the horizontal scanning frequency to be $f_H$, $E_1$ is expressed as follows:

$$E_1 = \{(Ei+E_1)ak+Ei\}\epsilon;$$

hence $$E_1 = \frac{(1 + ak)\epsilon}{1 - ak\epsilon} Ei \qquad (2)$$

where $\epsilon = \exp(-j\omega/f_H)$.

Therefore, a transfer function H to the output signal $E_2$ of the recursive comb filter 29 is expressed as follows:

$$H = \frac{E_2}{Ei} = \frac{(1 + \alpha k)(1 - \epsilon)}{1 - \alpha k \epsilon} \quad (3)$$

Equation (3) is same as equation (1), except that k is replaced by $\alpha k$. Therefore, similar to equation (1), if the frequency of the input signal is $nf_H$, then $\epsilon=1$, so $H=0$; and if $(n+0.5) f_H$, then $\epsilon=-1$, so $H=2$. That is, it means a comb filter reaching the peak when the frequency of the input frequency is $(n+0.5)f_H$, and the bottom when the frequency is $nf_H$.

Figure 11:
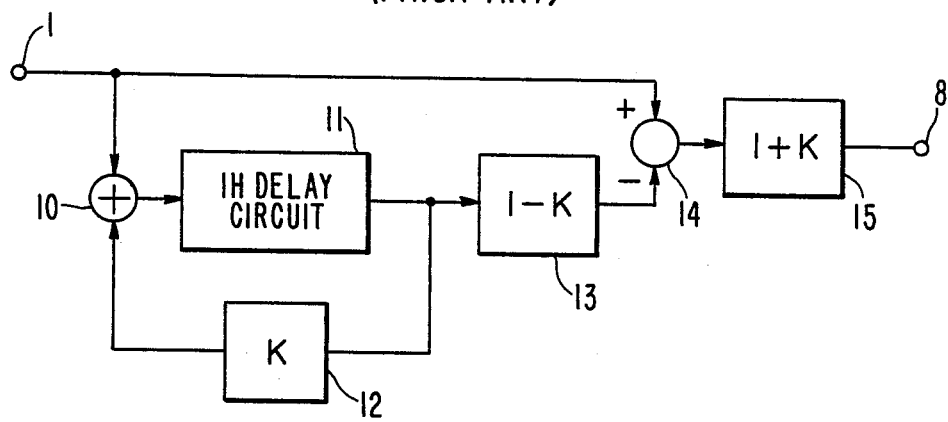
FIG. 11 is a block diagram of a conventional recursive comb filter.
Figure 13:
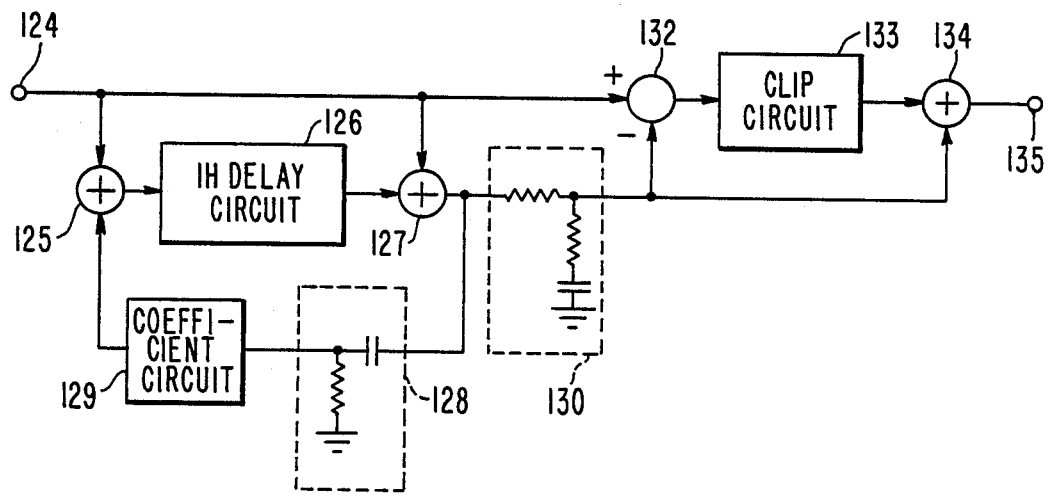
FIG. 13 is a block diagram of still another conventional signal processing circuit.

Thus, the same characteristic obtained in the circuit in FIG. 11 is obtained in the circuit in FIG. 1. What is more, in FIG. 1, since the filter circuit 22 is added to the coefficient circuit, the characteristic can be changed depending on the frequency of the input signal.

The filter circuit 22 in FIG. 1 is a high-emphasis filter, and when the frequency is high, $\alpha$ approaches 1, and when the frequency is low, $\alpha$ becomes $R_2/(R_1+R_2)$, so that $\alpha k$ in equation (3), that is, k in equation (1) becomes smaller when the frequency becomes lower. Therefore, a characteristic widened in the passing range when the frequency is high and narrowed when low is obtained.

Figure 2:
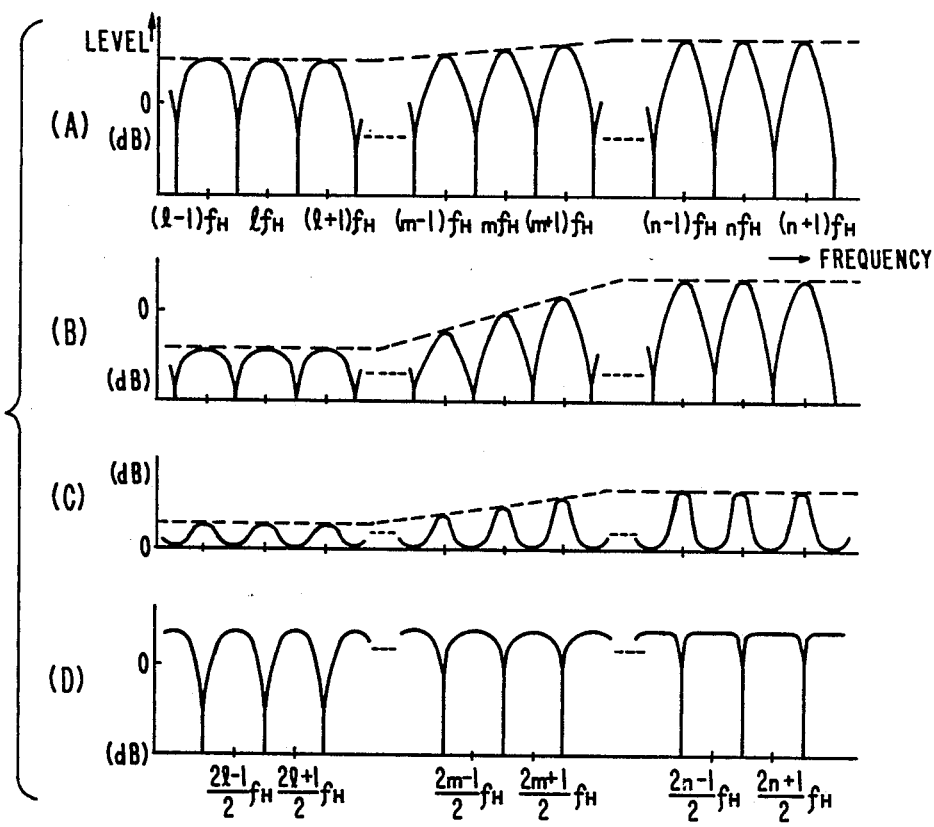
FIG. 2 and FIG. 3 are waveform diagrams showing the frequency characteristics of respective parts in FIG. 1.

The frequency characteristics at some parts in FIG. 1 are as shown in FIG. 2. FIG. 2 (a) is the frequency characteristic of the output of the adder 21, (b) is the frequency characteristic of the output of the filter circuit 22, in which the filter circuit 22 has the characteristic of the high-emphasis filter of the envelope shown by broken line in (b), and (c) is the frequency characteristic of the output of the adder 24. Of course, the frequency characteristic of output $E_1$ of the 1H delay circuit 25 becomes as shown in (c). The frequency characteristic of the output signal $E_2$ of the recursive comb filter 29 is as shown in (d).

Figure 4:
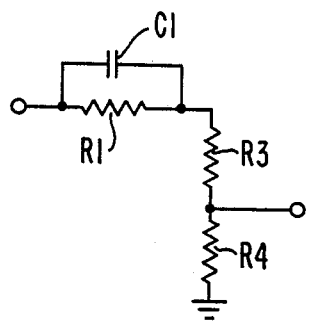
FIG. 4 is a circuit diagram of an embodiment combining the filter circuit and coefficient circuit in FIG. 1.

Meanwhile, in FIG. 1, the filter circuit and the coefficient circuit are separately provided, but it is also possible to combine them together as shown in FIG. 4. In FIG. 4, when $R_3$ and $R_4$ are selected so as to establish the following equations, it is equal to the combination of the filter circuit and the coefficient circuit in FIG. 1.

$$R_3 = (1-k) R_2$$

$$R_4 = k R_2$$

Thus, the signal obtained in the recursive comb filter is the noise components small in amplitude and components without vertical correlation relatively large in amplitude. By limiting the amplitude in the amplitude limiter 27, the components without vertical correlation are removed, and only the noise components are left.

This signal is adjusted to the amplitude of the input signal in the second coefficient circuit 29. For example, supposing this coefficient to be y, the output signal Eo is given as follows:

$$\frac{Eo}{Ei} = 1 - \frac{(1 + \alpha k)(1 - \epsilon)}{1 - \alpha k \epsilon} y \quad (6)$$

When $y=\frac{1}{2}$, it is rewritten as follows:

$$\frac{Eo}{Ei} = \frac{(1 + \alpha k)(1 + \epsilon)}{1 - \alpha k \epsilon} \quad (7)$$

This means a comb filter which becomes the bottom when the frequency of the input signal is $(n+0.5) f_H$, and in the bottom part the output signal is 0.

Figure 3:
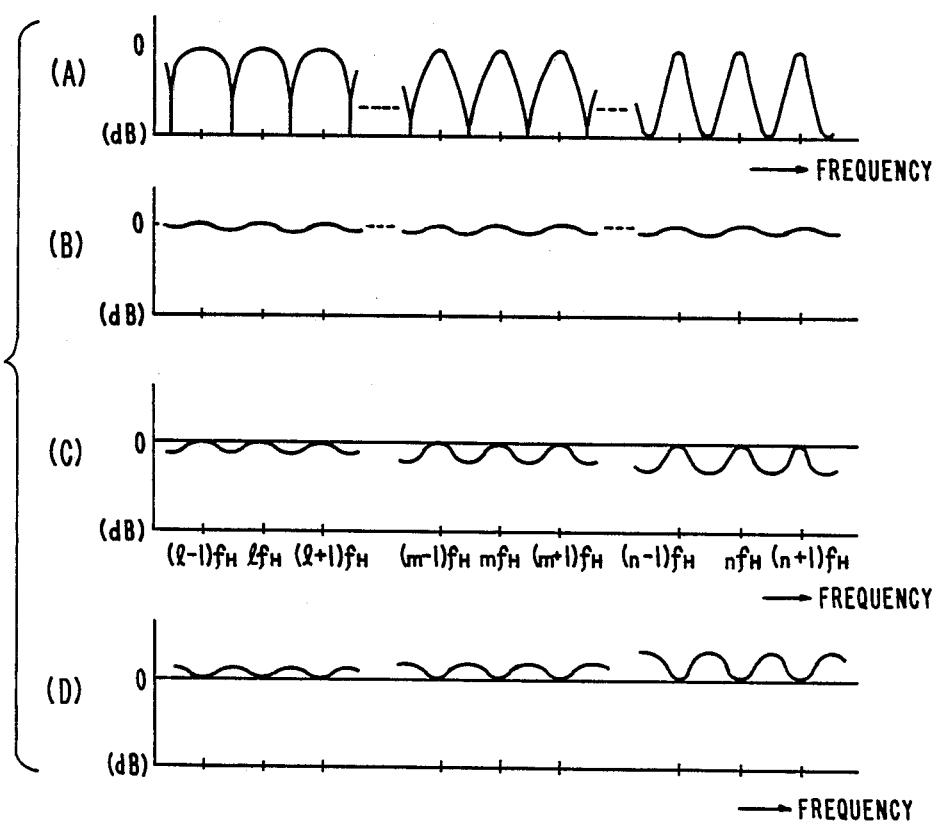

In this way, the components not limited by the amplitude limiter 27 are subtracted from the input signal in the subtracter 3, and as a result, the frequency characteristic of the output signal Eo appearing at output terminal 4 becomes as shown in FIG. 3 (a). In the absence of vertical correlation, since the amplitude is limited by the amplitude limiter 27, the output of the second coefficient circuit 28 is almost null, so that a nearly same signal as the input signal is delivered to the output terminal 4 as shown in FIG. 3 (b).

Thus, by using the high-emphasis filter, the input signal is directly delivered where vertical correlation does not exist, and visible high frequency noise components can be effectively reduced where a vertical correlation exists. Or, generally, since the noise components of 1 to 2 MHz are said to be most visible, a similar effect will be obtained by using a band-emphasis filter to emphasis this frequency band.

Figure 5:
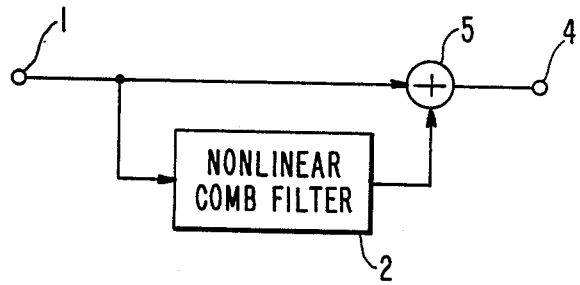
FIG. 5, FIG. 6 and FIG. 7 are block diagrams of other embodiments of this invention.

Or by decreasing the value of y smaller than $\frac{1}{2}$, the bottom part of FIG. 3 (a) goes up, and the characteristic becomes as shown in (c). In this case, it is intended to maintain the vertical resolution by diminishing the degree of noise reduction. And, as shown in FIG. 5, by using an adder 5 instead of the subtractor 3 in FIG. 1, when the value of y is properly determined, a reverse characteristic to that of FIG. 1 is obtained as shown in FIG. 3(d), and the portion without correlation is emphasized. So, if the noise increases in the process of recording or reproducing as in VTR, first by recording emphasizing the portion without correlation as in FIG. 5 and then by reducing the noise of the characteristic in FIG. 3 (c) in the composition of FIG. 1 when reproducing, the comprehensive frequency characteristic including recording and reproducing can be nearly flattened, and the noise can be reduced without deteriorating the vertical resolution.

Figure 6:
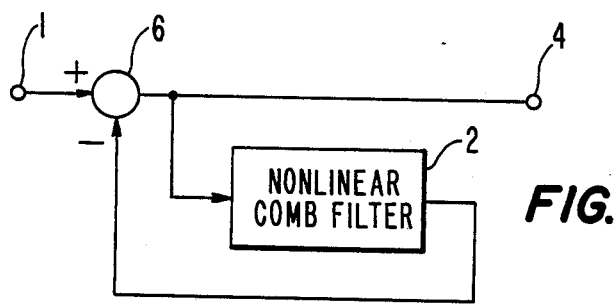

Or, as in FIG. 6, when it is configured to subtract the output from the recursive comb filter from the input signal to obtain an output signal and to use this output signal as the input to the recursive comb filter, a perfect inverse characteristic to that of FIG. 5 is obtained. That is, in the circuit in FIG. 5, by recording emphasizing the signal and suppressing when reproducing, the noise is reduced and the frequency characteristic can be flattened. In this case, the circuit is simple because the same value can be used as the coefficient of the second coefficient circuit.

Figure 7:
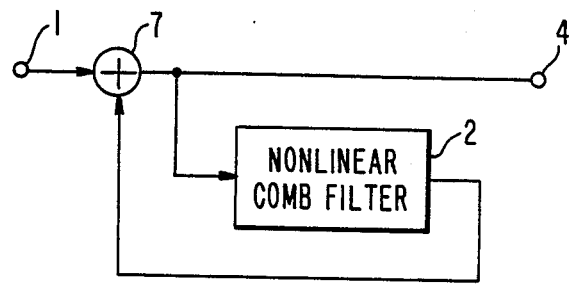
Figure 8:
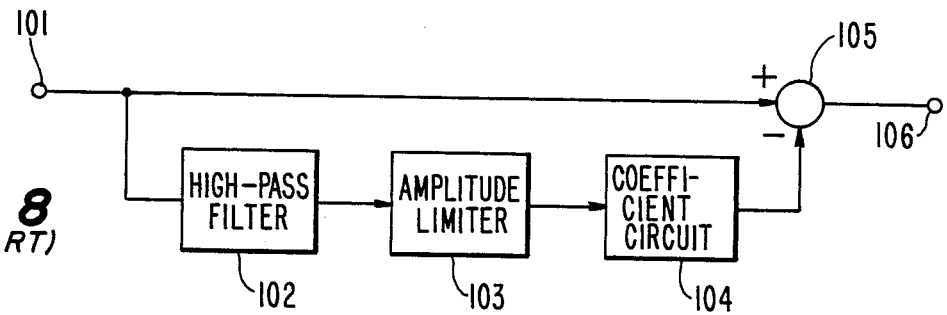
FIG. 8 is a block diagram of a conventional signal processing circuit.
Figure 9:
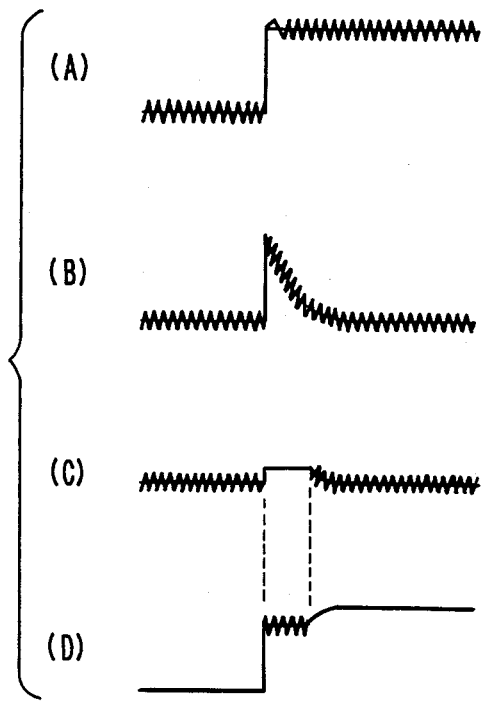
FIG. 9 is a waveform diagram of respective parts in FIG. 8.
Figure 12:
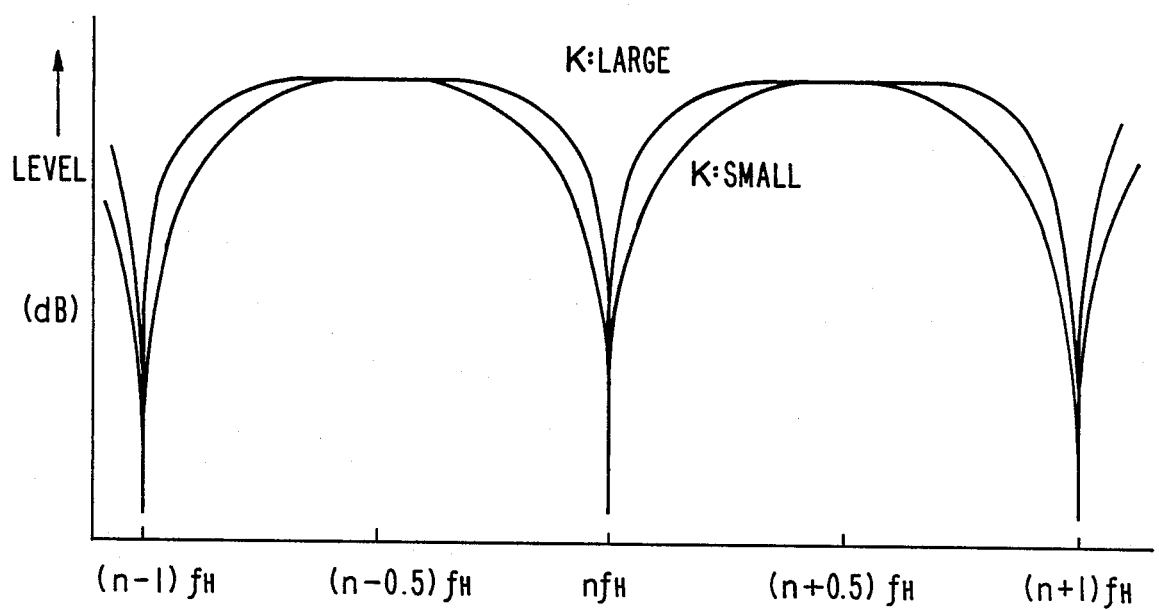
FIG. 12 is a frequency characteristic diagram showing the frequency characteristic of FIG. 11.
Figure 10:
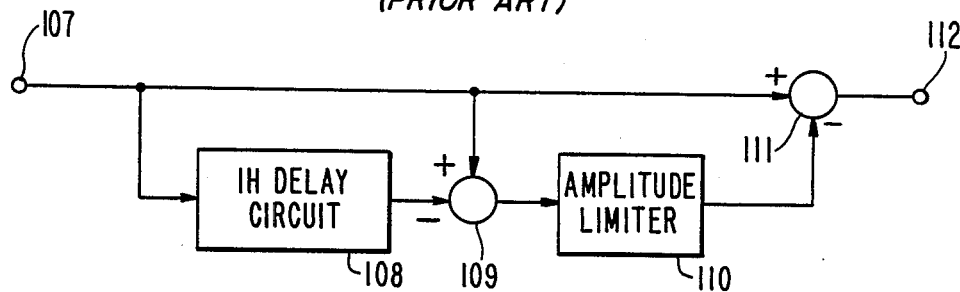
FIG. 10 is a block diagram of another conventional signal processing circuit.

Corresponding to the noise reduction in the circuit by FIG. 1, a perfectly inverse characteristic is obtained by the circuit in FIG. 7. In this combination, too, a similar noise reduction is possible. That is, by emphasizing the signal in the circuit in FIG. 7, the noise is reduced in the circuit in FIG. 1.

As described hereabove, according to this invention, by varying the characteristic of a comb filter depending on the frequency by using only one filter, the noise is effectively lowered, and the circuit may be composed simply, too. Moreover, by preliminarily emphasizing the components without vertical correlation when recording, and suppressing them together with the noise when reproducing, the noise can be reduced without lowering the vertical correlation resolution, so that it is extremely useful.

What is claimed is:

1. A luminance signal processing circuit comprising: a delay circuit for delaying a signal by one horizontal period time; a first adder for adding an input signal and an output signal of said delay circuit; a filter circuit for passing a specified frequency band of an output signal of said first adder; a first coefficient circuit for multiplying an output of said filter circuit with a specified coefficient; a second adder for adding said input signal and an output of said first coefficient circuit to use the sum output signal as an input signal of said delay circuit; a subtracter for subtracting the output signal of said delay circuit from the input signal of said delay circuit; an amplitude limiter for limiting the amplitude of an output signal of said subtracter; a second coefficient circuit for multiplying an output of said amplitude limiter with a specified coefficient; and an operation circuit for calculating a sum or difference of an output signal of said second coefficient circuit and said input signal, an output signal of said operation circuit being an output signal of said luminance signal processing circuit.

2. A luminance signal processing circuit according to claim 1, wherein said filter circuit possesses a high-emphasis characteristic.

3. A luminance signal processing circuit according to claim 1, wherein said filter circuit possesses a band-emphasis characteristic.

4. A luminance signal processing circuit according to claim 1, wherein said operation circuit is a subtractor, whereby said luminance signal processing circuit reduces noise in said input signal.

5. A luminance signal processing circuit according to claim 1, wherein said operation circuit is an adder, whereby said luminance signal processing circuit emphasizes said input signal.

6. A luminance signal processing circuit comprising: an operation circuit for calculating a sum or difference of an input signal and another signal; a delay circuit for delaying a signal for one horizontal period; a first adder for adding an output signal of said operation circuit and an output signal of said delay circuit; a filter circuit for passing a specified frequency band of an output signal of said first adder; a first coefficient circuit for multiplying an output signal of said filter circuit with a specified coefficient; a second adder for adding the output signal of said operation circuit and an output signal of said coefficient circuit to use the sum output signal as an input signal to said delay circuit; a subtractor for subtracting the output signal of said delay circuit from the input signal of said delay circuit; an amplitude limiter for limiting the amplitude of an output signal of said subtractor; and a second coefficient circuit for multiplying an output of said amplitude limiter with a specified coefficient; an output signal of said second coefficient circuit being the another signal fed to said operation circuit, the output signal of said operation circuit being an output signal of said luminance signal processing circuit.

7. A luminance signal processing circuit according to claim 6, wherein said filter circuit possesses a high-emphasis characteristic.

8. A luminance signal processing circuit according to claim 6, wherein said filter circuit possesses a band-emphasis characteristic.

9. A luminance signal processing circuit according to claim 6, wherein said operation circuit is a subtractor, whereby said luminance signal processing circuit reduces noise in said input signal.

10. A luminance signal processing circuit according to claim 6, wherein said operation circuit is an adder, whereby said luminance signal processing circuit emphasizes said input signal.

11. A recursive comb filter comprising: a delay circuit for delaying a signal by one horizontal period; a first adder for adding an input signal and an output signal of said delay circuit; a filter circuit for passing a specified frequency band of an output signal of said first adder; a coefficient circuit for multiplying an output of said filter circuit with a specified coefficient; a second adder for adding said input signal and an output of said coefficient circuit to use the sum output signal as an input signal of said delay circuit; and a subtractor for subtracting the output signal of said delay circuit from the input signal of said delay circuit, an output signal of said subtractor being an output signal of said recursive comb filter.

12. A recursive comb filter according to claim 11, wherein said filter circuit possesses a high-emphasis characteristic.

13. A recursive comb filter according to claim 11, wherein said filter circuit possesses a band-emphasis characteristic.

* * * * *